Feb. 19, 1929.                                                        1,702,274
                         E. SCHMIDT
         DETERMINING THE QUANTITY OF FLOWING LIQUIDS OR GASES
                       Filed April 14, 1927
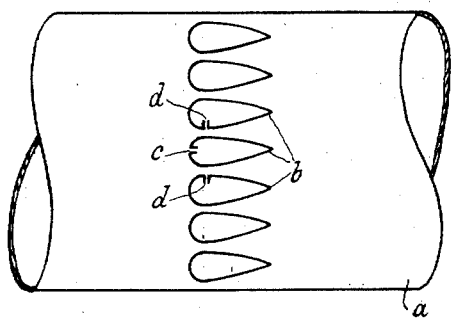
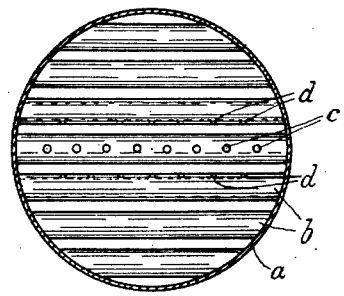 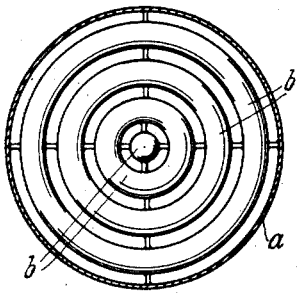
Inventor
Ernst Schmidt
Attorney.

Patented Feb. 19, 1929.

1,702,274

UNITED STATES PATENT OFFICE.

ERNST SCHMIDT, OF DANZIG-LANGFUHR, FREE CITY OF DANZIG.

DETERMINING THE QUANTITY OF FLOWING LIQUIDS OR GASES.

Application filed April 14, 1927, Serial No. 183,830, and in Germany March 30, 1926.

This invention has reference to improvements in means for the determination of the quantites of gases, fluids or liquids while in motion and it is intended to provide for a better and more easily operated measurement than it was possible heretofore and to generally improve devices of the kind referred to and to increase the accuracy of observation. In accordance with the previous art the determination of the quantities of gases, fluids and liquids flowing through pipe conduits and the like has been generally effected by means of speed arresting rings or Venturi-tubes by means of which the cross-sectional area is reduced and a reduction of pressure obtained the value of which serves as a measure for the amount of liquid flowing through the respective cross-section. The reducing rings used for this purpose in their essential features comprise a disc with a central opening, which, on acount of its small size, is adapted to be easily secured in a flange connection of the pipe conduit. With this arrangement there is however the drawback of very considerable loss of pressure, that is to say the difference of pressure employed for measuring purposes is mostly annihilated by the interior friction of the jet of liquid resulting in very considerable losses of energy. A Venturi-tube, on the other hand, mainly comprises a gradual narrowing of the pipe which merges into a slender conical enlargement thereof. By means of this enlargement a considerable portion of the drop of pressure produced will be recovered. Thus, with the same measuring pressure the loss of pressure and the resulting loss of energy is very much smaller in the case of the Venturi-tube than in the case of the ordinary pressure reducing ring. With the Venturi-tube there is however the inconvenience of a relatively large structural length amounting to about ten times the diameter of the pipe, and in view thereof such tubes become very expensive and are of very great weight particularly in the case of pipe conduits of large diameters, and it is necessary to take the mounting of the Venturi-tubes in consideration when the pipe-conduit is put in position and planned and this arrangement is not suitable for the so-called travelling measurements. It has been attempted to eliminate the difficulties of the Venturi-tube by producing the narrowing and the gradual enlargement of the cross-sectional area of the flowing liquid, instead of by a constriction of the pipe walls, by a displacement body with obtuse front end and pointed other extremity which has been disposed in the axis of the pipe. This displacement body leaves only an annular cross-section for the liquid, which cross-section on account of the slender extremity of the displacement body, becomes gradually enlarged and therefore provides very favorable conditions for the recovery of pressure. There are however a variety of difficulties accompanying the use of these displacement bodies. The length of a device of this kind should be a multiple of the diameter of the pipe, provided it is intended to produce a satisfactory recovery of the pressure, so that it will become very unhandy and of great weight particularly in the case of great pipe diameters. Furthermore, at the point of mounting the displacement body the pipe wall must be very accurately dimensioned and the displacement body should be very exactly centered.

Now, my invention is intended to overcome the various difficulties accompanying the use of the Venturi-tube and of the relatively large displacement body in the axis of the pipe; and in view thereof and in order to produce more favorable pressure conditions the otherwise required constriction of the active flowing cross-section is replaced by a plurality of apertures which are disposed between substantially adjacently arranged small displacement bodies of comparatively low axial extension. These displacement bodies may for instance comprise a plurality of rods or pipes between which the liquid or fluid is caused to flow in a similar manner as through the slots of a grate. If, as an exemplification, the cross-section of the individual rods or pipes is such as to present small resistance against flow, that is to say, by making them of a shape presenting a substantially obtuse front and pointed extremity, slots will be produced between the individual members which will be reduced in the direction of flow in the first place and will then become gradually enlarged. Thus in a similar manner as with the Venturi-tube the conversion of pressure into velocity occurring up to the narrowest portion of the cross-section is reconverted again in the then following gradual enlargement and a very high efficiency of recovery is thereby produced.

The displacement bodies are preferably assembled in a frame common to all of them and similar to a grate, and this arrangement may be designated as an arresting grate. The individual elements of this grate may of course not only be arranged as parallel rods, but also in other ways, thus for instance as concentric rings. In the case of large pipe sections the several rod shaped elements may be secured in position by transverse stays or props. By imparting to these transverse stays a similar cross-sectional shape as to the rods or bars of the grate a kind of lattice-shaped body is obtained the openings of which present the described configuration, that is to say they are provided with a gradually increasing enlargement at the rear of the narrowest cross-section. This kind of arresting grate may also be obtained by providing in a solid plate of suitable thickness a plurality of slots or openings of the form described.

One of the advantages of the invention consists in the small axial extension of the arresting grate which, even in the case of large pipe diameters for which the Venturi-tube required or a corresponding individual displacement body in the axis of the pipe would have a length of several meters, would only need to amount to a few centimeters. In view thereof the axial extension of the arresting grate may be reduced to any desired extent without sacrificing the important advantage of the gradual enlargement at the rear of the narrowest cross-section, provided the number of openings is correspondingly increased. The small axial extension of the arresting grate admits of its being secured in position between two flanges of a pipe connection in a similar manner as in the case of arresting rings. The arresting grate in accordance with this invention therefore combines the advantage of a small weight and of the possibility of the ready fixing in position, which latter was an advantage of the rings heretofore employed, with the superior pressure recovering efficiency of the Venturi-tube, and avoids the disadvantages of the two structures referred to. A particular advantage of the arresting grate according to this invention is the fact that it may be adapted without difficulty to rectangular cross-sections likewise which heretofore could not be fitted for sufficiently exact measurements both by the employment of the controlling and arresting rings as well as by the employment of Venturi-tubes.

The connecting points for the measuring of the differential pressure are preferably provided at the points of maximum pressure differences. The connecting point for the higher pressure will therefore be preferably arranged on the front side of one or several displacement bodies. It may however also be arranged in the pipe wall and in front of the arresting grate, in case the connections in the grate itself are not desirable. The arrangement first mentioned is somewhat more favorable, because in that case the full arresting pressure of the flow is utilized. The connection for transmitting the lower pressure is arranged at the point of maximum velocity at the narrowest cross-section of the conduits or passages either at the displacement bodies themselves or in the pipe wall or in the frame of the arresting grate.

The invention is exemplified in the embodiments shown in Figures 1–3 of the drawing of which Figure 1 is an elevation of one form of construction while Figure 2 is a cross-sectional view corresponding to Figure 1; Figure 3 is a cross-sectional view of another embodiment of the principles of the invention. In the drawing: $a$ is the pipe conduit in which the measurements are to be performed, $b$ are the several elements constituting the arresting grate which in the case under consideration are parallel rods; or they may be pipes as shown in Figure 3, all these being arranged at small distances from each other, so as to provide passages through which the liquid is adapted to flow. $c$ is a point for the transmission of pressure at the front end of the displacement body and $d$ are the pressure transmitting points at the narrowest cross-section. A differential gauge, not shown in the drawing may therefore be connected to the aperture $c$ and on the other hand to the apertures $d$. By imparting to the pressure transmitting openings the general configurations of slots or by providing a plurality thereof the danger of their becoming choked up is reduced to a minimum, and a very favorable average value of the pressure is provided on the entire cross-sectional area. The transmission of the pressure from the measuring point at the displacement bodies is effected in the most simple manner by making the displacement bodies $b$ of substantially tubular shape, as indicated in Figure 2 of the drawing.

It should be understood that the invention is not restricted to the particular forms of embodiment herein shown and described by way of exemplification, the broad principles of the invention admitting of various other forms of embodiments within the scope and spirit of the invention, as defined in the appended claims.

I claim:

1. In a device of the kind described a hollow cylindrical body, a plurality of parallel, spacedly disposed substantially pear-shaped bodies, constituting concentric rings and with their pointed ends in the longitudinal direction of the cylindrical body and means at the obtuse ends of certain of said bodies and near the constricted points of the intervening passages for measuring and transmitting the pressure of the fluids or liquids flowing through the cylindrical body.

2. In a device of the kind described, a fluid-conduit-element of uniform diameter, a plurality of members substantially pear-shaped in cross-section secured in the interior of said element with their obtuse ends flush and in proximity to each other, and pressure transmitting and measuring means, respectively alternatingly disposed at the obtuse end and at the most outwardly bulged lateral portion of the obtuse end of neighboring members.

Dr. ERNST SCHMIDT.